(12) United States Patent
Nagano

(10) Patent No.: US 7,735,084 B2
(45) Date of Patent: Jun. 8, 2010

(54) COMMUNICATION PROCESSING APPARATUS, COMMUNICATION PROCESSING METHOD, AND COMPUTER PROGRAM

(75) Inventor: Motohiko Nagano, Tokyo (JP)

(73) Assignee: Sony Corporation, Tokyo (JP)

( * ) Notice: Subject to any disclaimer, the term of this patent is extended or adjusted under 35 U.S.C. 154(b) by 668 days.

(21) Appl. No.: 10/267,571

(22) Filed: Oct. 9, 2002

(65) Prior Publication Data

US 2003/0079031 A1 Apr. 24, 2003

(30) Foreign Application Priority Data

Oct. 18, 2001 (JP) ............... 2001-320112

(51) Int. Cl.
*G06F 9/46* (2006.01)
*G06F 15/173* (2006.01)
*G06F 15/16* (2006.01)

(52) U.S. Cl. ............ 718/103; 718/104; 709/229; 709/226

(58) Field of Classification Search ......... 718/103–104; 709/219, 229, 226
See application file for complete search history.

(56) References Cited

U.S. PATENT DOCUMENTS

| | | | | |
|---|---|---|---|---|
| 4,466,063 A | * | 8/1984 | Segarra et al. | ........... 709/226 |
| 5,692,129 A | * | 11/1997 | Sonderegger et al. | ... 707/103 R |
| 6,014,695 A | * | 1/2000 | Yamashita et al. | ........ 709/219 |
| 6,335,922 B1 | * | 1/2002 | Tiedemann et al. | ........ 370/335 |
| 6,563,793 B1 | * | 5/2003 | Golden et al. | ........... 370/236 |
| 6,763,371 B1 | * | 7/2004 | Jandel | ............... 709/204 |
| 6,968,379 B2 | * | 11/2005 | Nielsen | ............... 709/226 |
| 7,366,533 B2 | * | 4/2008 | Biggs et al. | ........... 455/509 |

FOREIGN PATENT DOCUMENTS

| | | |
|---|---|---|
| JP | 06-209347 | 7/1994 |
| JP | 2001-160841 | 6/2001 |
| JP | 2001-285353 | 10/2001 |

* cited by examiner

*Primary Examiner*—Meng-Ai An
*Assistant Examiner*—Camquy Truong
(74) *Attorney, Agent, or Firm*—Robert J. Depke; Rockey, Depke & Lyons, LLC

(57) ABSTRACT

A communication processing apparatus is disclosed which performs a process for establishing a connection upon receipt of a communication connection request. The apparatus includes a controlling element for performing a connection availability determination process upon receipt of the connection request. The controlling element performs a user identification process for identifying a user representing a connection request sender based on data in the connection request. The controlling element further carries out the process for establishing the connection if communication processing resources allocated for the user having a user identifier acquired in the user identification process are judged to be available.

3 Claims, 18 Drawing Sheets

F I G. 1
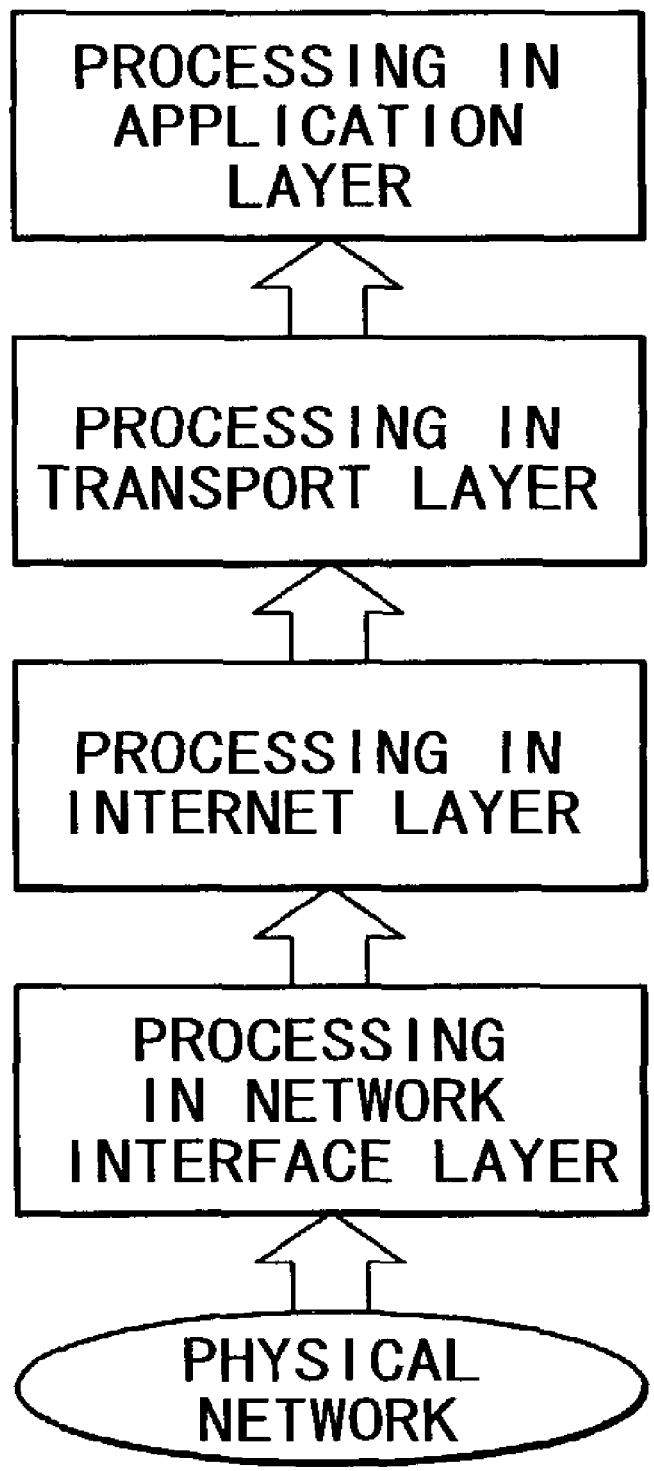

FIG. 7

USER TABLE

| USER ID | SENDER MAC ADDRESS | SENDER IP ADDRESS | DESTINATION PORT NUMBER |
|---|---|---|---|
| OWN USER | 35.42.1.56.1375 | 45.87.123.245 | |
| FRIEND A | | 42.134.78.95 | 80 |
| GENERAL | | | 80 |

FIG. 9

| USER ID | RESOURCE USE CONDITION |
|---|---|
| OWN USER 1 | 1-9 |
| FRIEND A | 3-9 |
| GENERAL | 8-9 |
| null | 9 |

FIG. 11

| RESOURCE AREA NUMBER | MAXIMUM CONNECTION COUNT | RECEIVE QUEUE SIZE | AREA AVAILABILITY | RESOURCE AREA START ADDRESS |
|---|---|---|---|---|
| 1 | 20 | 5 | AVAILABLE | 0xEFFFF9000 |
| 2 | 40 | 10 | UNAVAILABLE | 0xDFFFF8000 |
| ... | | | | |
| 9 | 100 | 20 | AVAILABLE | 0xCFFFF4000 |

FIG. 13

RESOURCE AREA CORRESPONDONCE TABLE

| END POINT | RESOURCE AREA NUMBER |
|---|---|
| (42. 14. 53. 235, 80) | 1 |
| (32. 14. 53. 232, 80) | 9 |
| . . . | . . . |

FIG. 15

| GROUP ID | USER ID | MAXIMUM CONNECTION COUNT | CURRENT CONNECTION COUNT |
|---|---|---|---|
| OWN GROUP | OWNER | 20 | 10 |
| FRIEND GROUP | OWNER<br>FRIEND A<br>FRIEND B | 10 | 10 |
| GENERAL GROUP | GENERAL | 5 | 4 |

FIG. 17

RESOURCE USE STATUS TABLE

| END POINT | GROUP ID | |
|---|---|---|
| | OWNER GROUP | |
| (42.14.53.235, 80) | ... | ... |

COMMUNICATION PROCESSING APPARATUS, COMMUNICATION PROCESSING METHOD, AND COMPUTER PROGRAM

BACKGROUND OF THE INVENTION

The present invention relates to a communication processing apparatus, a communication processing method, and a computer program. More specifically, the invention relates to a communication processing apparatus, a communication processing method and a computer program for allowing a server or like equipment connected to a network to restrict the amount of available resources in processing illustratively TCP-based communication connections depending on the party it communicates with, thereby preventing an inordinately high volume of communication traffic with low-priority users from hampering the communications of high-priority users.

The widespread use of high-speed, continuous-connection Internet services today is allowing a growing number of individuals to use their PCs as servers maintaining always-on connection with the Internet. Where the PC is used as a server in the typical household, there may be three kinds of server users: the server owner, the server owner's family members and friends, and others (i.e., general public).

These days, more and more people are inclined to disclose their diaries, web pages, digital photo images, and self-created images and/or sound data through their servers on the Internet. Individuals' servers are thus as likely to be accessed by the general public as any corporate or institutional servers. In such cases, the individuals server owner may well wish to prioritize the availability of the server service. Specifically, the owner's use should preferably be given top priority over those service requests by the general public which could hamper the owner from utilizing his or her own server as desired.

The trouble is that conventional servers have no capability of setting priorities depending on the profile of users when establishing TCP connections for the server service. A predetermined amount of TCP traffic processing resources (memory areas and disc areas) is always allocated for each user. The same resources are allocated in unrestrained fashion to every user being processed for a TCP connection or a connection request.

In an environment such as individuals' servers where users should preferably be prioritized but cannot, the resources for TCP traffic processing could be exhausted by low-priority users. The latter users, by using up the available resources, could bar high-priority users from making use of the server service. There are two cases in which the TCP traffic processing resources can be exhausted by low-priority users:

(Case 1)
This is a case in which numerous TCP connections are established by a plurality of low-priority users.

(Case 2)
This is a case where low-priority users have launched DoS (denial of services) attacks on the resources for TCP traffic processing. The DoS attack is a hacking action carried out by unscrupulous parties exhausting or disabling the resources that should be made available for legitimate users but are denied to them. Illustratively, the DoS attack involves sending large amount of data or invalid packets to the server system in question or transmitting illegal commands to the server through a loophole in the OS or an application program with a view to shutting down the system.

There are two major types of DoS attacks on TCP traffic processing resources: a SYN flood attack, and a DoS attack aimed at establishing a large number of TCP connections.

The SYN flood attack takes advantage of the limited data size of the queue for managing halfway states of TCP/IP connections being established during what is known as a three-way handshaking procedure. The attack involves sending to the target server a large number of SYN packets each requesting establishment of a TCP connection. Because the three-way handshaking procedure is never completed, numerous halfway states are being generated to flood the halfway state management queue of the target server. The server is thus disabled temporarily from establishing new TCP connections.

The DoS attack aimed at establishing a large number of TCP connections takes place generally as follows: there is a predetermined maximum number of TCP connections that can be processed at a time, dictated by the need to use limited resources such as the memory and CPU every time a TCP connection is established. If multiple machines were employed to establish numerous TCP connections with the target server and thereby exhaust all available resources, the server would become incapable of establishing any more TCP connections. Depending on its capabilities, the target server may then have to reduce its processing speeds or may undergo a system down.

One conventional countermeasure against DoS attacks is the use of a firewall or a router for filtering purposes. The filtering scheme is designed conditionally to restrict sender IP addresses and usable ports upon establishment of TCP connections; any TCP connection request failing to meet relevant conditions is rejected.

The use of the server service by users can thus be limited by the filtering method preventing DoS attacks by any unscrupulous users not authorized for service usage. However, there exists no distinction between authorized users in their right to utilize TCP connection resources of the server. For this reason, it is impossible to prevent the above-described irregularities of both case 1 and case 2.

The SYN flood attack has been countered conventionally by a method called "SYN cookies." This is an optional feature provided by kernel versions 2.0.30 or higher of Linux OS. In a conventional TCP connection request process, resources for the connection are allocated upon receipt of a SYN packet representing the request. By contrast, the SYN-cookies feature returns a SYN-ACK packet in response to the received SYN packet without allocating any resources. The resources are allocated only after the connection is established upon receipt of an ACK packet, whereby the SYN flood attack is forestalled.

The foregoing method can prevent the SYN flood attack of case 2 above but is incapable of prioritizing users as in the convention TCP traffic processing. The incapacity to prioritize leaves the resources exhausted by TCP connections of low-priority users in case of the DoS attack aimed at establishing numerous TCP connections in both case 1 and case 2 above.

Another countermeasure against the SYN flood attack has been introduced by Microsoft Corporation with its Windows NT4.0 SP2 or higher. This feature involves taking such defensive measures as increasing the queue size and reducing time-out period settings when SYN flood attacks have flooded the queue for managing halfway states of TCP/IP connections being established. The feature is fairly effective in thwarting the SYN flood attack but, as with the SYN-cookies scheme, it can let the resources be exhausted by low-priority users launching the DoS attack requesting establishment of numerous TCP connections in both case 1 and case 2 above.

In an environment such as individuals' servers where users should preferably be prioritized somehow but cannot, the exhaustive use of the resources for TCP traffic processing by low-priority users will hamper high-priority users from making any use of the server. Problems then occur in the above-described two cases which are paraphrased as follows:

(Case 1) This is a case where a plurality of low-priority users have established numerous TCP connections.

(Case 2) This is a case in which low-priority users have launched DoS attacks on the resources for TCP traffic processing.

In each of these two cases, it is necessary that high-priority users be enabled to establish TCP connections to utilize the server.

SUMMARY OF THE INVENTION

It is an object of the present invention to provide a communication processing apparatus, a communication processing method, and a computer program for allowing high-priority users to establish TCP connections to utilize the server even in the face of potential troubles such as those cited as case 1 and case 2 above.

In carrying out the invention and according a first aspect thereof, there is provided a communication processing apparatus for performing a process for establishing a connection upon receipt of a communication connection request, the communication processing apparatus including a controlling element for performing a connection availability determination process upon receipt of the connection request; wherein the controlling element performs a user identification process for identifying a user representing a connection request sender based on data in the connection request, the controlling element further performing the process for establishing the connection if communication processing resources allocated for the user having a user identifier acquired in the user identification process are judged to be available.

In a preferred structure according to the first aspect of the invention, the communication processing resources may include a plurality of storage areas furnished by either a memory or a storage unit. The inventive communication processing apparatus may further include a resource use condition table which associates the user identifiers of connection request senders with the storage areas thereby establishing the storage areas available for each user, wherein the controlling element may search the resource use condition table for any storage areas available as resources for the user identified in the user identification process.

In another preferred structure according to the first aspect of the invention, the communication processing resources may include connection counts each representing the number of connections that may be established. The inventive communication processing apparatus may further include a resource use condition table which associates the user identifiers of connection request senders with the connection counts thereby establishing the connections available for each user, wherein the controlling element may search the resource use condition table for any connections available for the user identified in the user identification process.

In a further preferred structure according to the first aspect of the invention, the controlling element may acquire in the user identification process at least either a sender IP address or a sender MAC address of the connection request as user information.

In an even further preferred structure according to the first aspect of the invention, the controlling element may acquire in the user identification process a destination port number of the connection request as user information, and may perform the process for establishing the connection if communication processing resources allocated for the acquired destination port number are judged to be available.

In a still further preferred structure according to the first aspect of the invention, the controlling element may perform the process for establishing the connection by successively carrying out: a user identification process for identifying the user corresponding to the connection request sender based on a user table which associates address information with user identifiers; a resource use condition determination process for determining a resource use condition corresponding to the user based on a resource use condition table which associates the user identifiers with resource use conditions including resource area information; and a resource area determination process for determining a connection-applicable resource area corresponding to the connection request sender based on a resource management information table which associates the resource area information with resource availability information.

In a yet further preferred structure according to the first aspect of the invention, the controlling element may perform the process for establishing the connection by successively carrying out: a user identification process for identifying the user corresponding to the connection request sender based on a user table which associates address information with user identifiers; a resource use condition determination process for determining a resource use condition corresponding to the user based on a resource use condition table which associates the user identifiers with resource use conditions including resource area information; and a resource area determination process for determining a connection-applicable resource area corresponding to the connection request sender based on a resource management information table which associates the resource area information with resource availability information; wherein the resource use condition table may allocate more resource areas as resource use conditions for the user identifiers of users of higher priorities.

In another preferred structure according to the first aspect of the invention, the controlling element may perform the process for establishing the connection by successively carrying out: a user identification process for identifying the user corresponding to the connection request sender based on a user table which associates address information with user identifiers; and a resource use condition determination process for searching a resource use condition table for an entry of any available connection based on user identification data acquired in the user identification process, the resource use condition table associating each of the user identifiers with a group identifier, a maximum connection count, and a current connection count.

In a further preferred structure according to the first aspect of the invention, the controlling element may perform the process for establishing the connection by successively carrying out: a user identification process for identifying the user corresponding to the connection request sender based on a user table which associates address information with user identifiers; and a resource use condition determination process for searching a resource use condition table for an entry of any available connection based on user identification data acquired in the user identification process, the resource use condition table associating each of the user identifiers with a group identifier, a maximum connection count, and a current connection count; wherein the resource use condition table may associate the user identifier of each user of a higher priority with a plurality of different group identifiers.

In an even further preferred structure according to the first aspect of the invention, the controlling element may perform a connection availability determination process upon receipt of a SYN packet included in a TCP connection request representing the connection request, the controlling element further identifying the user based on sender identification data included in the SYN packet.

According to a second aspect of the invention, there is provided a communication processing method for performing a process for establishing a connection upon receipt of a communication connection request, the communication processing method including the steps of: performing a user identification process for identifying a user representing a connection request sender based on data in the connection request; and performing a resource determination process for establishing the connection if communication processing resources allocated for the user having a user identifier acquired in the user identification process are judged to be available.

In a preferred variation according to the second aspect of the invention, the communication processing resources may include a plurality of storage areas furnished by either a memory or a storage unit; and the step of performing the resource determination process may further include the step of searching a resource use condition table for any storage areas available as resources for the user identified in the user identification process, the resource use condition table associating the user identifiers of connection request senders with the storage areas thereby establishing the storage areas available for each user.

In another preferred variation according to the second aspect of the invention, the communication processing resources may include connection counts each representing the number of connections that may be established; and the step of performing the resource determination process may further include the step of searching a resource use condition table for any connections available for the user identified in the user identification process, the resource use condition table associating the user identifiers of connection request senders with the connection counts thereby establishing the connections available for each user.

In a further preferred variation according to the second aspect of the invention, the step of performing the user identification process may further include the step of acquiring at least either a sender IP address or a sender MAC address of the connection request as user information.

In an even further preferred structure according to the second aspect of the invention, the step of performing the user identification process may further include the step of acquiring a destination port number of the connection request as user information; and the step of performing the resource determination process may further include the step of performing the process for establishing the connection if communication processing resources allocated for the acquired destination port number are judged to be available.

In a still further preferred variation according to the second aspect of the invention, the method for performing the process for establishing the connection may further include the steps of successively carrying out: a user identification process for identifying the user corresponding to the connection request sender based on a user table which associates address information with user identifiers; a resource use condition determination process for determining a resource use condition corresponding to the user based on a resource use condition table which associates the user identifiers with resource use conditions including resource area information; and a resource area determination process for determining a connection-applicable resource area corresponding to the connection request sender based on a resource management information table which associates the resource area information with resource availability information.

In a yet further preferred variation according to the second aspect of the invention, the method for performing the process for establishing the connection may further include the steps of successively carrying out: a user identification process for identifying the user corresponding to the connection request sender based on a user table which associates address information with user identifiers; and a resource use condition determination process for searching a resource use condition table for an entry of any available connection based on user identification data acquired in the user identification process, the resource use condition table associating each of the user identifiers with a group identifier, a maximum connection count, and a current connection count.

In another preferred variation according to the second aspect of the invention, the step of performing the user identification process may further include the step of identifying the user based on sender identification data included in a SYN packet when the SYN packet held in a TCP connection request issued as the connection request is received.

According to a third aspect of the invention, there is provided a computer program for causing a computer system to perform a process for establishing a connection upon receipt of a communication connection request, the computer program including the steps of: performing a user identification process for identifying a user representing a connection request sender based on data in the connection request; and performing a resource determination process for establishing the connection if communication processing resources allocated for the user having a user identifier acquired in the user identification process are judged to be available.

The computer program according to the invention may be described in a computer-readable format and offered illustratively for use with general-purpose computers capable of executing diverse program codes. The medium carrying the computer program may be any one of such storage media as CDs, floppy discs and MOs; or of communication media such as networks. The computer-readable program is installed from the medium into a suitable computer system so as to implement the processes described by the program.

Other objects, features and advantages of the invention will become more apparent upon a reading of the following description and appended drawings. In this specification, the term "system" refers to a logically assembled configuration of multiple devices which may or may not be housed in a single enclosure.

BRIEF DESCRIPTION OF THE DRAWINGS

FIG. 1 is a schematic view outlining TCP connection processing;

FIG. 7 is a tabular view showing a typical structure of a user table utilized in a user identification process carried out by the inventive communication processing apparatus;

FIG. 9 is a tabular view depicting a typical structure of a resource use condition table utilized in a resource use condition determination process carried out by the inventive communication processing apparatus;

FIG. 11 is a tabular view indicating a typical structure of a resource management information table utilized in a resource area determination process carried out by the inventive communication processing apparatus;

FIG. 13 is a tabular view showing a typical structure of a resource area correspondence table utilized in a connection management process carried out by the inventive communication processing apparatus;

FIG. 15 is a tabular view indicating a typical structure of another resource management information table utilized in another resource area determination process (second example in the ensuing description) carried out by the inventive communication processing apparatus;

FIG. 17 is a tabular view depicting a typical structure of another resource use condition table utilized in another connection management process (second example in the ensuing description) carried out by the inventive communication processing apparatus.

DESCRIPTION OF THE PREFERRED EMBODIMENTS

Figure 2:
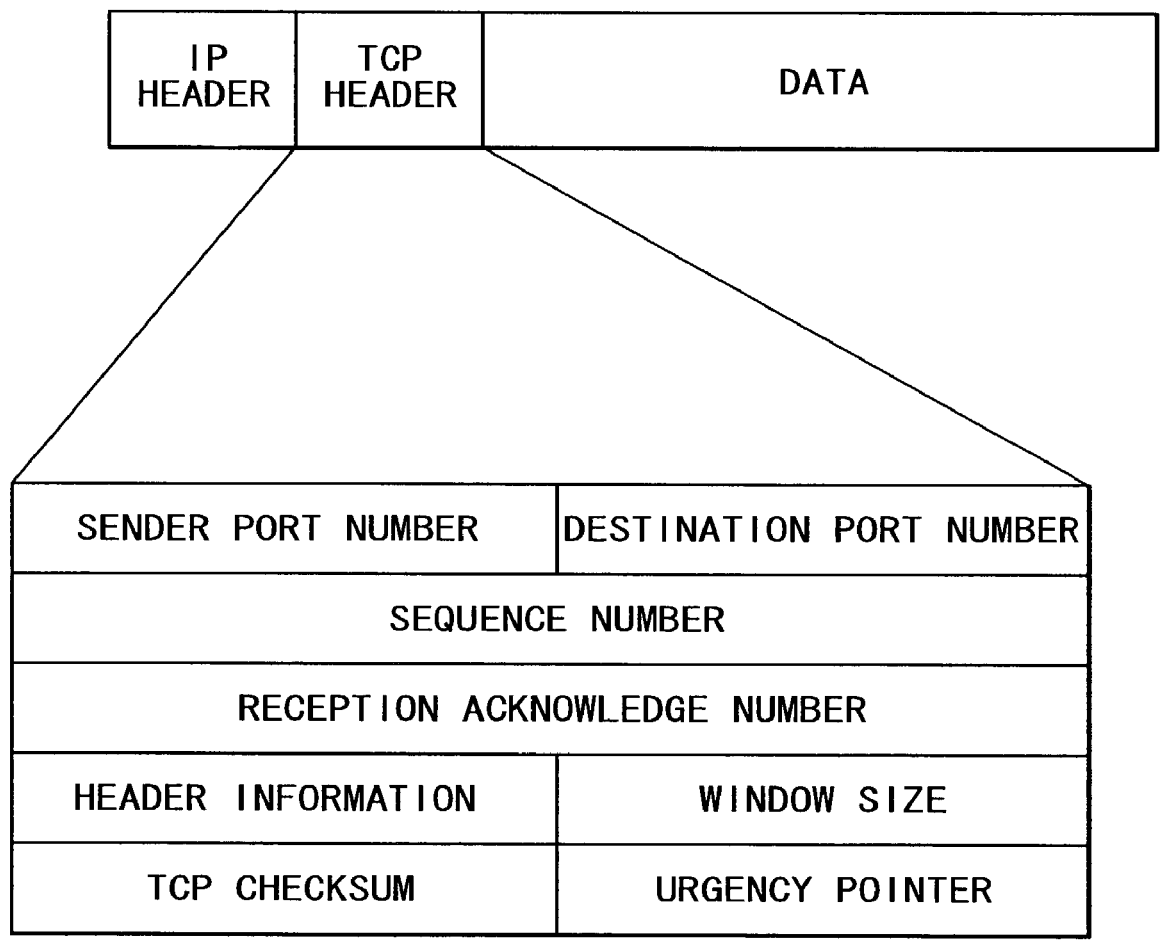
FIG. 2 is a schematic view depicting a typical structure of a TCP header in an IP packet.

Preferred embodiments of this invention will now be described by referring to the accompanying drawings. TCP connection-related processes on network terminals are outlined below with reference to FIG. 1.

In FIG. 1, the physical network corresponding to layer 1 of the OSI (Open Systems Interconnection) Reference Model ensures data transmission and reception using electrical and optical signals and performs processes over data transmission channels such as connectors and cables. The network interface layer corresponds to layer 2 of the OSI Reference Model and involves processing the recognition, transmission and reception of packets between communication devices. The Internet layer corresponding to layer 3 of the OSI Reference Model takes charge of address management and processes the selection of transmission channels. The transport layer corresponds to layer 4 of the OSI Reference Model and involves controlling data transfers between communication devices and processing the probabilities of reliability in data transfers. The application layer corresponds to level 7 of the OSI Reference Model and involves controlling communication processes for data transmission and reception between application programs and effecting the processes specific to the applications.

This invention relates to improvements in the techniques for TCP connection processes within the transport layer. The inventive apparatus supplements conventional TCP connection processing techniques with the following means:

means for identifying users based on TCP connection request traffic data;

means for obtaining a resource use condition for each user;

means for taking into consideration the resource use condition of each user so as to determine the presence or absence of available resources for the user in question;

means for managing the current use status of resources; and means for establishing the resource use condition for each user.

In this description, the term "user" refers to a communication-requesting individual or a communication-requesting terminal submitting a connection request to the communication processing apparatus, and the term "resources" denotes TCP traffic processing resources (i.e., memory areas and disc areas).

The communication processing apparatus of this invention retains therein user-specific information for setting resource use conditions, i.e., information specific to each communication-requesting individual or terminal regarding establishment of the relevant resource use condition. Upon receipt of a communication request, the inventive apparatus judges whether the requesting individual or terminal can communicate using resources under the condition defined by the resource use condition setting information. The requesting individual or terminal is allowed to communicate through appropriate resource processing only if the communication is judged possible using the resources under the stipulated condition.

FIG. 2 shows a TCP (Transmission Control Protocol) format of a IP packet as a typical structure of communication packets exchanged between communication devices. A TCP header includes: a sender port number; a destination port number; a sequence number indicating the data sequence in terms of the number of bytes that exist between the beginning of this data packet and the start of the transmission of the data in question; a reception acknowledge number indicating the sequence number of the data to be transmitted next by the transmitting party; header information made up of code bits representing a header length, a TCP segment processing method and others; a window size indicating the number of the remaining data bytes that can be received; a checksum serving as the value for guaranteeing the reliability of the TCP packet; and an urgency pointer indicating whether the data need to be urgently processed.

Figure 3:
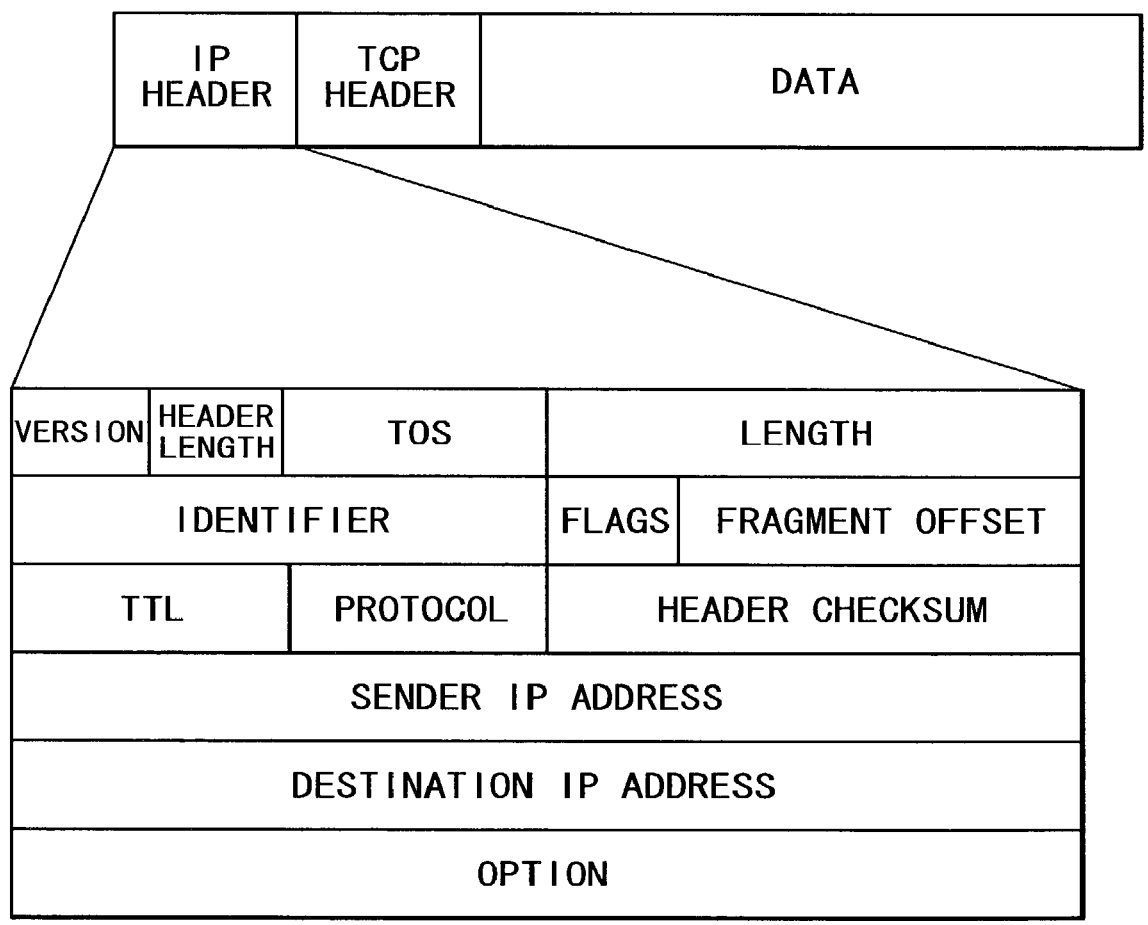
FIG. 3 is a schematic view indicating a typical structure of an IP header in the IP packet.

FIG. 3 shows details of the IP header in the IP packet structure. The IP header includes: a version number such as IPv4 or IPv6; a header length; a TOS (type of service) field containing priority information; a packet length; a packet identifier; flags serving as control information about data fragmentation in the IP layer; a fragment offset indicating the locations of fragmented data; a TTL (time to live) denoting the time period up to discarding of data; a checksum for protocols (4:IP, TCP:7, UDP:17, . . . ) for use in upper layers; a sender IP address; and a destination IP address.

Figure 4:
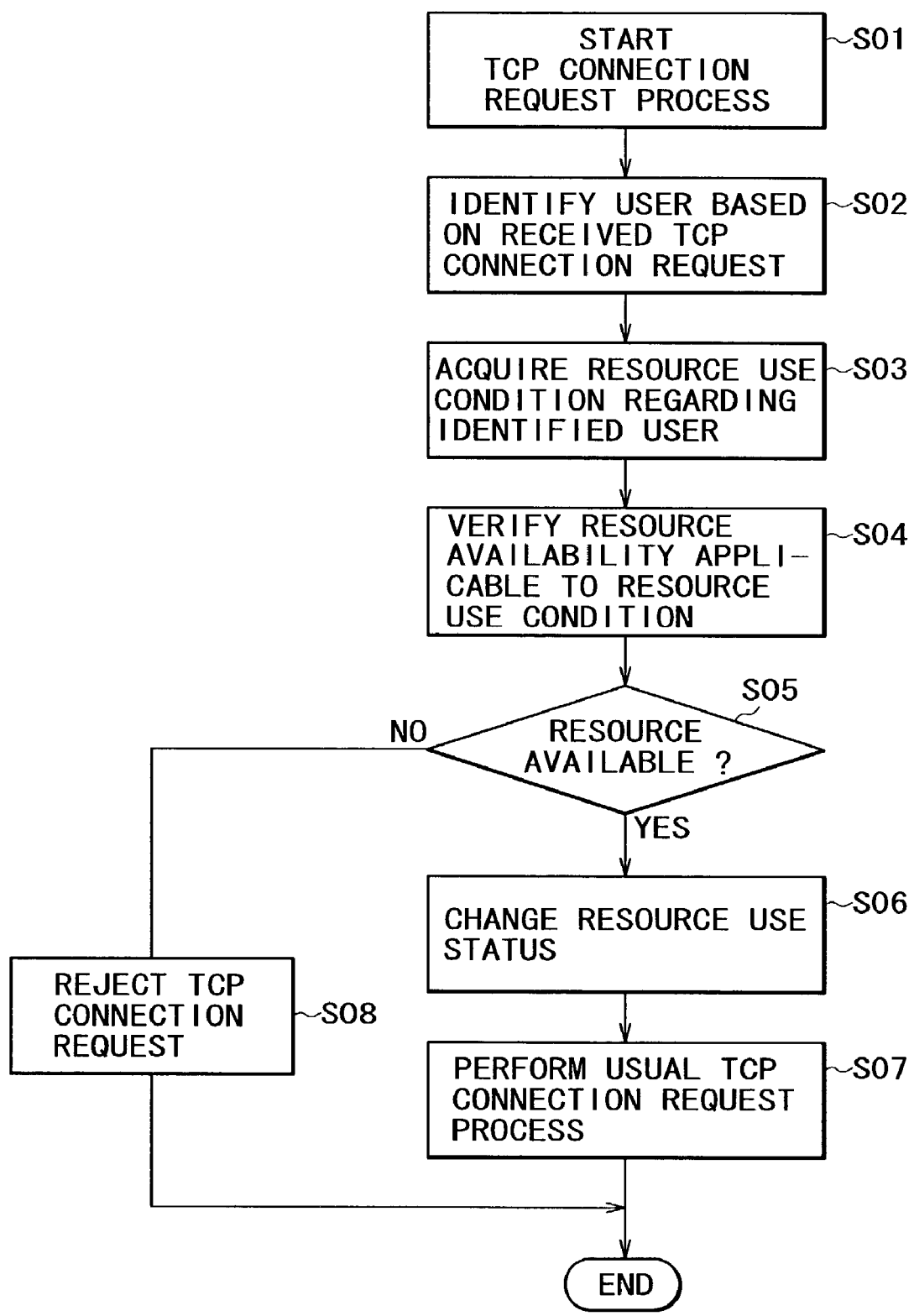
FIG. 4 is a flowchart of steps constituting a TCP connection request process performed by a communication processing apparatus according to the invention.

The flow of processing upon receipt of a TCP connection request by the communication processing apparatus of this invention will now be described with reference to the flowchart of FIG. 4.

In step S01, the communication processing apparatus receives traffic data for requesting a TCP connection. Under TCP, a SYN packet, a SYNACK and an ACK are exchanged between the apparatus and the requesting party in a three-way handshake control message exchanging process for establishing the connection. The traffic data in the process are made up of the content of the SYN packet, a frame header of the frame (i.e., packet) containing the SYN packet, and a datagram header.

In step S02, the communication processing apparatus analyzes the frame (packet) of the received traffic data to identify the user. The user identification process is carried out illustratively as a process of acquiring the combination of conditions regarding a sender MAC address, a sender IP address, a sender port number, and a destination port number.

In step S03, the resource use condition regarding the user is acquired. The resource use condition is a condition determined beforehand by the communication processing apparatus in correspondence with each user. Specific examples of the conditions will be discussed later. In step S04, a check is made to see whether there are currently available resources on the basis of the acquired resource use condition and the current resource use status. If currently available resources are judged to exist ("Yes" in step S05), then the resource use status is changed (in step S06) and a usual TCP connection request process is carried out (in step S07). If there is no currently available resource ("No" in step S05), then this TCP connection request is rejected (in step S08).

It might happen that resources are released in a TCP connection process other than the TCP connection request process, such as a time-out halfway through the three-way handshake or a connection termination. If that happens, then the resource use status is changed following the release of the resources.

The processing above permits setting of the relevant resource use condition specific to the user. This makes it possible to limit the amount of available resources for users with low priorities.

Where low-priority users are subject to restrictions on available resources, two things are made possible: the resources are not exhausted in processing TCP connections of low-priority users; and the resources are allocated preferentially for users with high priorities. That means even when the server is being congested dealing with low-priority users, high-priority users are granted preferential and efficient access to the server.

Low-priority users could be barred from utilizing the service during DoS (denial of service) attacks on TCP connections. Even under such attacks, however, high-priority users may be given access to the resources that cannot be utilized by the low-priority users. This means that the irregularities discussed above as case 2 can be resolved.

Similarly, where numerous attempts by low-priority users to access the server have reduced the efficiency of service utilization, high-priority users are granted preferential access to the service through the use of their preferentially allocated resources. This means that the problem discussed above as case 1 can be resolved.

Described below are two examples of a resource determination process (first and second examples) for allocating resources to users depending on their priorities. The first example of the resource determination process involves dividing available resources into a plurality of areas to be managed, limiting the divided resource areas for use by each user, and determining the availability of a connection for the user in question depending on the user's priority dictated by the limited area use status. The second example of the resource determination process involves restricting the number of connections for each user, and determining the availability of connections for each user depending on the user's priority.

[Resource Determination Process: First Example]

In the conventional TCP connection process regarding each user, the resources (memory areas and disc areas) for TCP traffic processing are fixed to a constant range of areas irrespective of the user, i.e., communication-requesting individual or terminal. Improvements are made to this process by the inventive information processing apparatus carrying out illustratively the first example of the resource determination process, as described below. In short, the resources are divided into a plurality of areas to be managed, and each user is subject to restraints on the use of each resource area.

The communication processing apparatus of this invention supplements the conventional TCP connection process with the following extended features:

dividing the resources used in the TCP connection process into a plurality of areas;

designating usable resource areas for each connection established in the TCP connection process; and additionally performing a resource determination process immediately before the TCP connection request process.

The extended features above permit a TCP connection for each identified user, designating the appropriate resource area for the user in question. The inventive communication processing apparatus is designed to divide the resources used in the TCP connection process into a plurality of areas and, in response to a connection request, perform a usable resource area determination process by identifying the user for each connection established in the transport layer of the TCP connection processing shown in FIG. 1.

The resource determination process is made up of a first, a second, and a third phase. The first phase is constituted by a user identification process for identifying either the user alone or both the user and the service to be used based on traffic data derived from the TCP connection request. The second phase is composed of a resource use condition determination process for determining the resource use condition for each user identified. The third phase consists of a resource area determination process for determining the usable resource area based on the resource use condition in effect. The resource determination process made up of these three phases makes it possible to limit the use of resource areas depending on the identified user.

Figure 5:
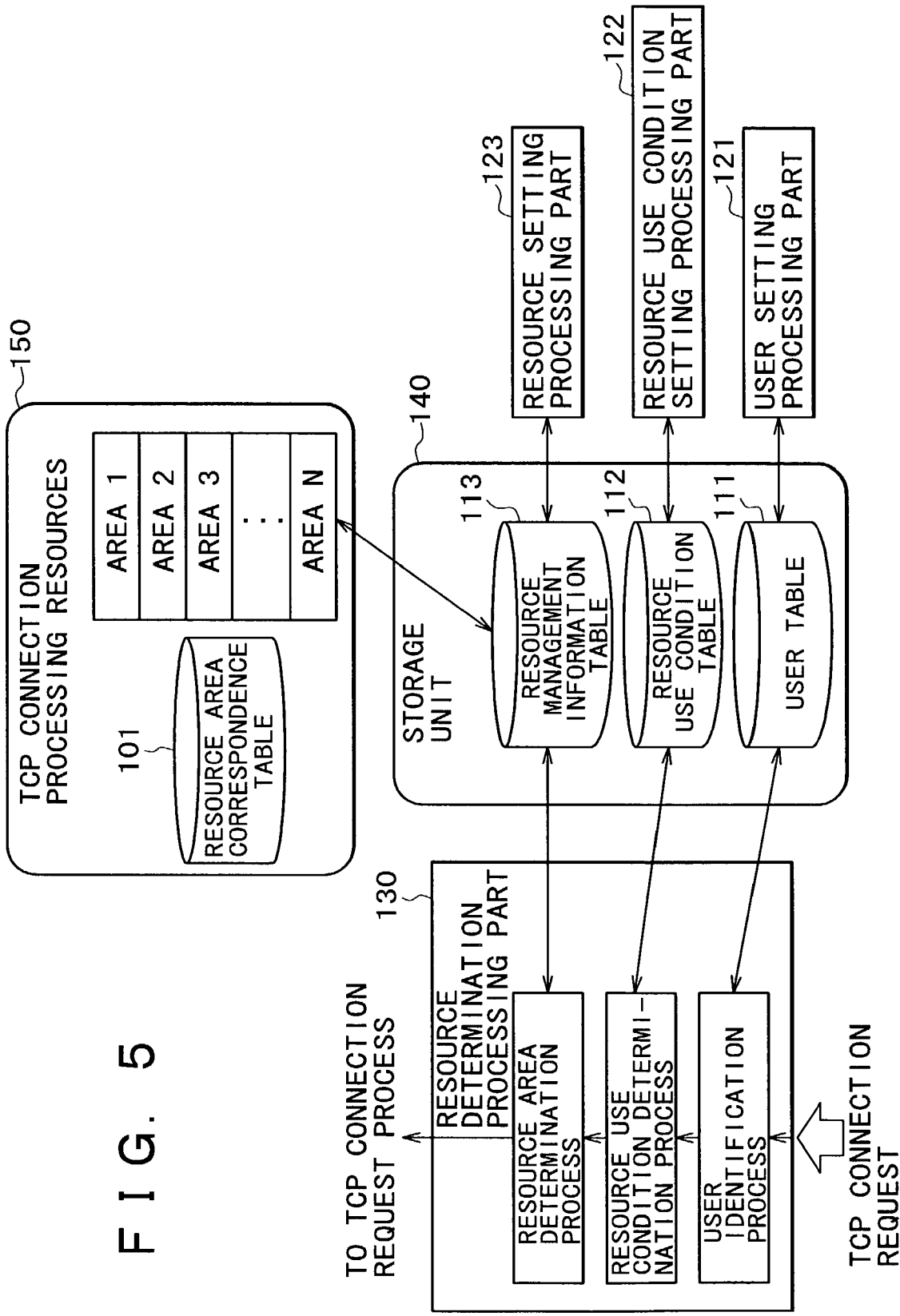
FIG. 5 is a schematic flow diagram outlining the TCP connection request process performed by the inventive communication processing apparatus.

FIG. 5 is a schematic flow diagram illustrating details of the resource determination process performed by the inventive communication processing apparatus in response to a TCP connection request sent to the apparatus, the process being implemented specifically by that controlling element of the apparatus which effects communication processing control.

TCP connection processing resources 150 in FIG. 5 represent a collection of resources (memory areas and disc areas) for use in TCP traffic processing. As illustrated, the resources 150 are divided into a plurality of areas 1 through N.

Figure 6:
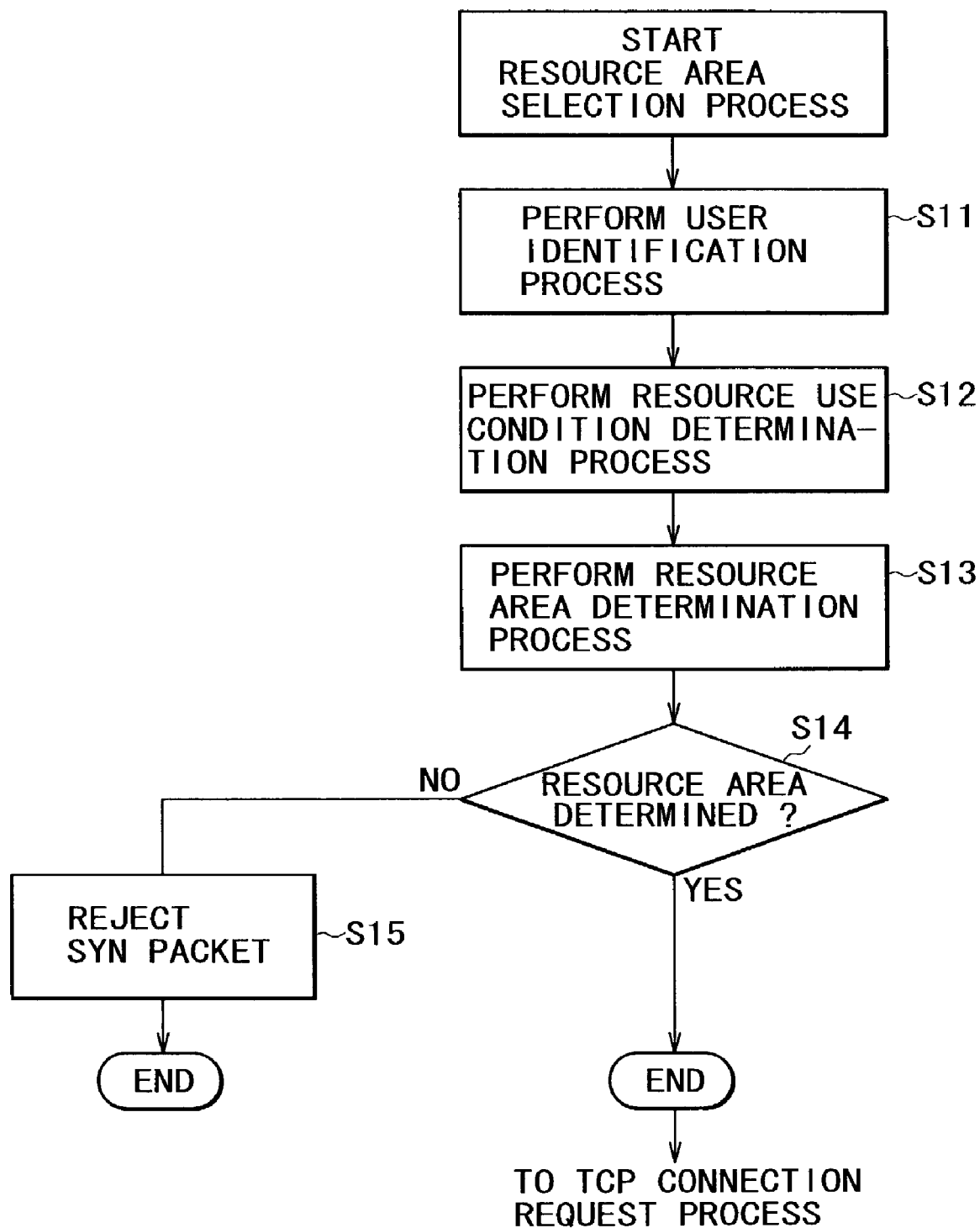
FIG. 6 is a flowchart of steps constituting a resource area selection process performed by the inventive communication processing apparatus.

FIG. 6 is a flowchart of steps outlining the resource determination process performed by the inventive communication processing apparatus in response to the TCP connection request. Upon receipt of the request constituted by a SYN packet complying with a three-way handshake protocol, a resource determination processing part 130 carries out the three phases of the process outlined above.

In step S11 of FIG. 6, a user identification process is performed in order to identify either the user alone or both the user and the service to be used based on the traffic data derived from the TCP connection request. In step S12, a resource use condition determination process is carried out to determine the resource use condition for the identified user. In step S13, a resource area determination process is effected so as to determine usable resource areas under the resource use condition. In step S14, a check is made to see if the usable resource areas are determined preparatory to responding to the TCP connection request. If the resources are judged usable so that a communication connection may be established ("Yes" in step S14), then a SYNACK packet is transmitted. If there are no usable resources ("No" in step S14), then the received SYN packet is rejected (in step S15).

As shown in FIG. 5, the three phases of the resource determination process, i.e., user identification process, resource use condition determination process, and resource area determination process, are carried out by referring respectively to a user table 111, a resource use condition table 112, and a resource management information table 113 held in a storage unit 140. Information is written to or updated in the tables 111, 112 and 113 by a user setting processing part 121, a resource use condition setting processing part 122, and a resource management information setting processing part 123 respectively.

Typical structures of the tables are depicted in some of the accompanying drawings. Each of the three phases making up the resource determination process performed by the resource determination processing part 130 is described below in detail by referring to the relevant drawings.

(First Phase: User Identification Process)

The user identification process is a process that identifies the user, i.e., an individual or a terminal requesting the communication processing apparatus to establish connection. This process is carried out by the apparatus upon receipt of a SYN packet from the communication-requesting party and in reference to the user table 111.

Figure 8:
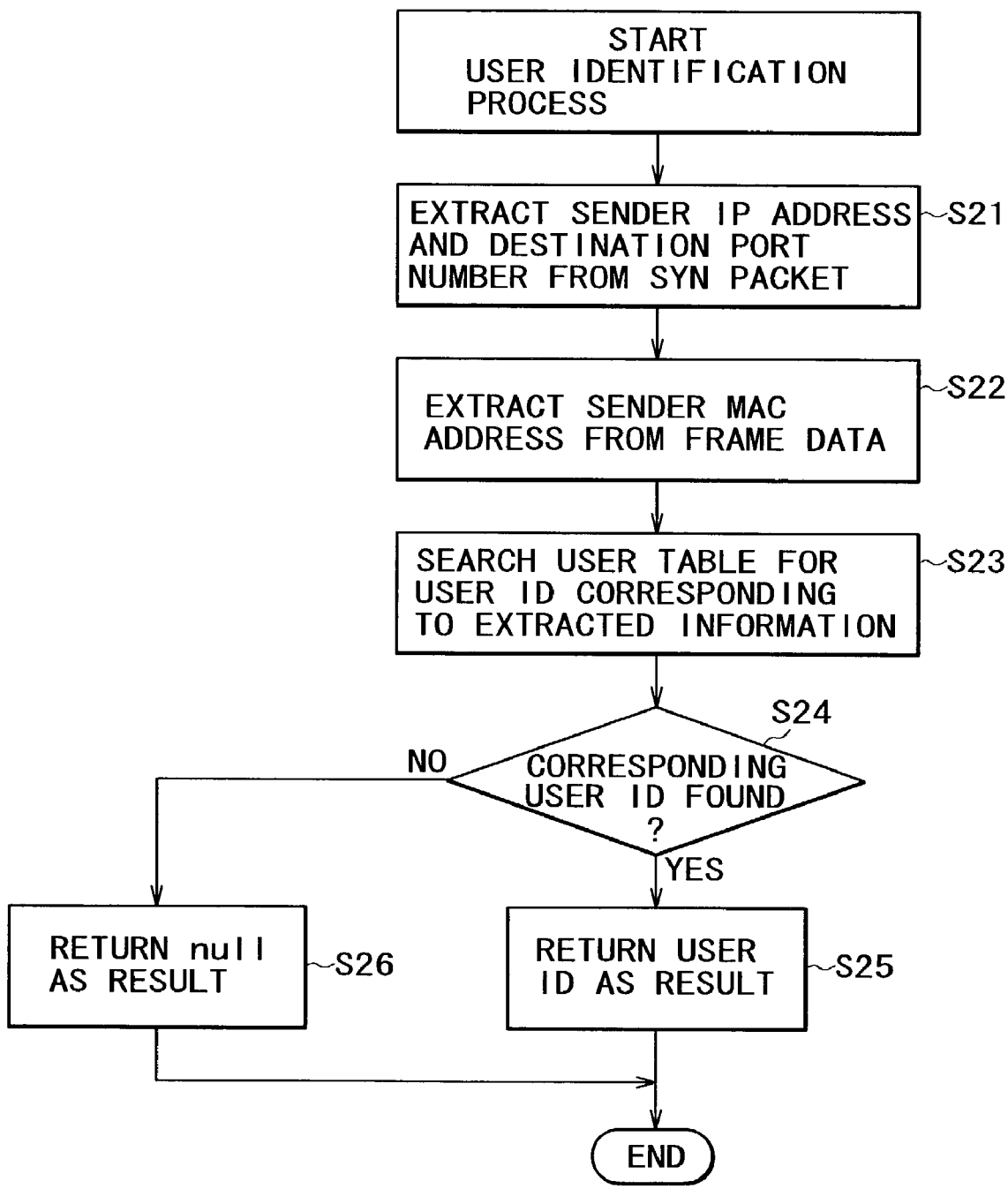
FIG. 8 is a flowchart of steps constituting the user identification process performed by the inventive communication processing apparatus.

FIG. 7 shows a typical structure of the user table 111, and FIG. 8 is a flowchart of steps constituting the user identification process effected by referring to the user table 111. As illustrated in FIG. 7, the user table 111 includes fields for user IDs, sender MAC addresses, sender IP addresses, and sender port numbers.

In the user table of FIG. 7, blank fields indicate they can accommodate any values. One or a plurality of identification conditions may be set for each user ID. In FIG. 7, for example, if the sender MAC address of a SYN packet is 35.42.1.56.1375 or the sender IP address of the packet is 45.87.123.245, then the user ID is identified as that of the own user's.

If the sender IP address is 42.134.78.95, then the user ID is identified as that of a friend A's. If any other sender MAC address or sender IP address is derived from the received SYN packet, then the connection request is judged to be from the general public, i.e., other than the owner user or friend A.

How the user identification process is performed by referring to the user table will now be described in detail with reference to the flowchart of FIG. 8.

The communication processing apparatus first extracts the sender IP address and destination port number from the SYN packet received as a TCP connection request (in step S21). The information can be acquired from an IP header (see FIG. 3) and from a TCP header (see FIG. 2) in the SYN packet.

When a frame header is obtained from the SYN packet, the sender MAC address is extracted from the frame data (in step S22). The user table is searched for a user ID based on the extracted information (in step S23). If the user ID is found (in step S24), the ID is handed over (in step S25) to the resource use condition determination process to be performed next. If the user ID is not found in the user table, step S26 is reached in which an outcome "null" is handed over to the downstream resource use condition determination process.

(Second Phase: Resource Use Condition Determination Process)

The resource use condition determination process is a process that determines the resource use condition for the user identified in the above-described user identification process. The resource use condition determination process is carried out by referring to the resource use condition determination table 112.

Figure 10:
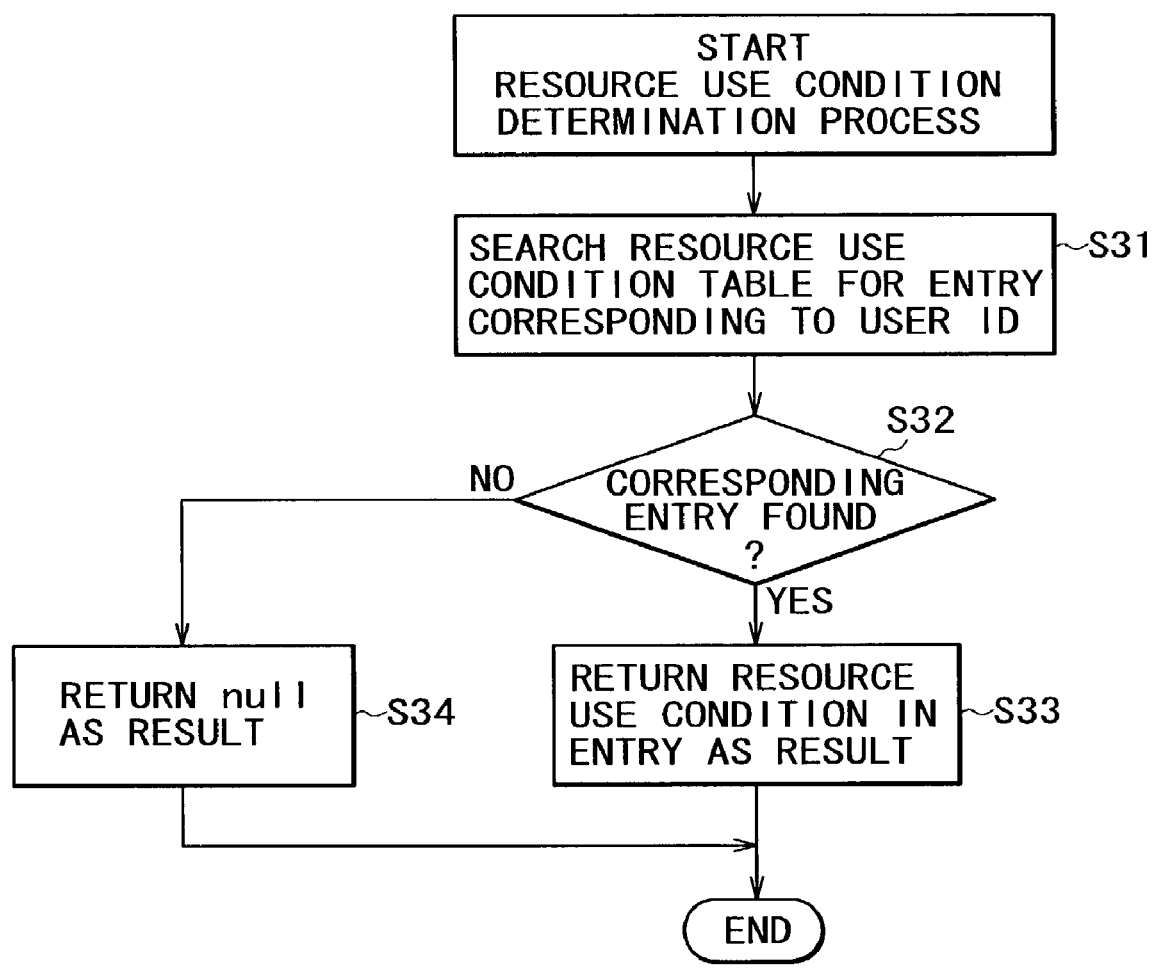
FIG. 10 is a flowchart of steps constituting the resource use condition determination process performed by the inventive communication processing apparatus.

FIG. 9 shows a typical structure of the resource use condition determination table 112, and FIG. 10 is a flowchart of steps constituting the resource use condition determination process carried out by referring to the resource use condition determination table 112. As illustrated in FIG. 9, the table associates usable resource area numbers regarded as resource use conditions with user IDs. Resource use condition fields in the table accommodate usable resource area numbers corresponding to each user ID. Area numbers are stored in the same sequential order as that of a search for free areas in the resource area determination process, to be described later as the third phase. For example, where available resource area numbers for a user ID "A" are 1, 2, 3, 4, and 7 and the designated sequence for free area search is also 1, 2, 3, 4 and 7, then a resource use condition field of the table holds data 1, 2-4, and 7.

The table example of FIG. 9 shows that the user ID acquired as "own user 1" in the upstream user identification process is matched with usable resource areas 1 through 9, that the user ID acquired as "friend A" is matched with usable resource areas 3 through 9, that the user ID acquired as "general" is matched with resource areas 8 and 9, and that the user ID acquired as "null" indicating other requesting parties is associated with only a single available resource area 9. On the basis of the user ID obtained in the upstream user identification process, usable resource area numbers are thus acquired from the resource use condition determination table during the resource use condition determination process.

The resource use condition determination process will now be described with reference to FIG. 10. This process is carried out after acquiring the result of the above-described user identification process in the first phase. When a user ID is received as a result of the upstream user identification process, the resource use condition table is searched for an entry corresponding to the user ID (in step S31). If the corresponding entry is found ("Yes" in step S32), then the resource use condition of the entry is handed over to the resource area determination process to be performed next (in step S33). If there is no corresponding entry ("No" in step S32), then a resulting user ID "null" is handed over to the downstream process (in step S34).

(Third Phase: Resource Area Determination Process)

The resource area determination process involves searching for and deciding on available resource areas in keeping with the resource use condition determined in the above-described resource use condition determination process. The resource area determination process is carried out by referring to the resource management information table 113.

Figure 12:
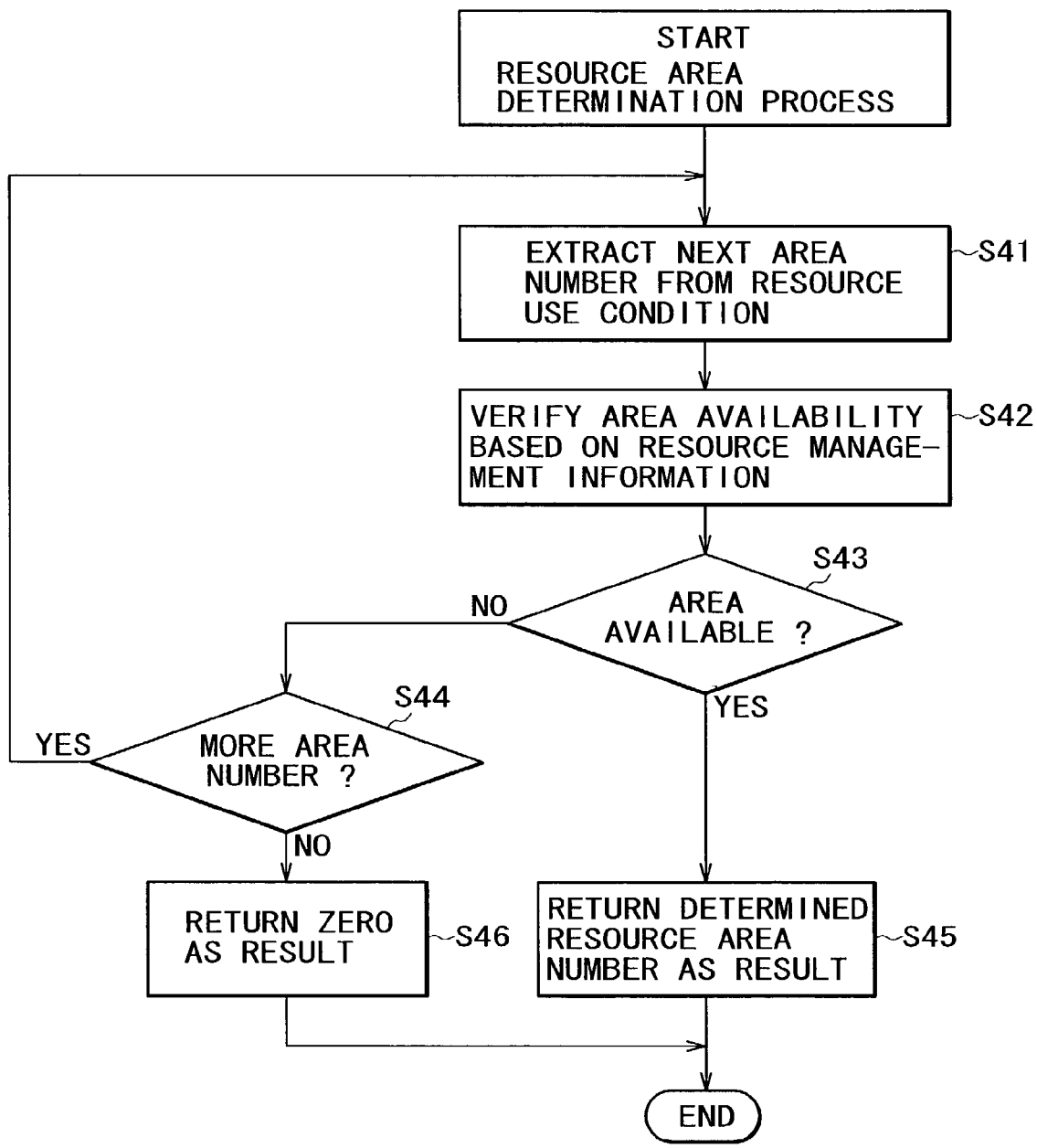
FIG. 12 is a flowchart of steps constituting the resource area determination process performed by the inventive communication processing apparatus.

FIG. 11 shows a typical structure of the resource management information table 113, and FIG. 12 is a flowchart of steps constituting the resource area determination process carried out by referring to the resource management information table 113. As illustrated in FIG. 11, the resource management information table 113 includes fields for resource area numbers each matched with a maximum connection count, a receive queue size, area availability, and a resource area start address.

In the resource management information table 113, resource areas are identified by resource area numbers. The maximum connection count is the largest number of TCP connections that may be managed using the available resource areas. The receive queue size is the number of halfway states of TCP connections being established while the three-way handshake protocol is yet to be finished. In the example of FIG. 11, the resource areas are determined by two criteria: the number of TCP connections that can be managed using the available resource areas, and the number of halfway states of TCP connections being established before completion of the three-way handshake protocol. However, this arrangement is not limitative of the invention. Alternatively, the areas may be determined by settings of the connection count or queue size in terms of the ratio of what is available to all bytes or to the entire resources.

The area availability indicates whether or not the resource areas currently have any free areas in which to process connection requests. The area availability field is set for "unavailable" if the queue of TCP connections fully or halfway established has overflowed, and is set for "available" if the queue has room to accommodate more TCP connections. The area availability is changed dynamically depending on the connection status. The resource area start address is an address used by the TCP connection process in utilizing resource areas. The address corresponds to a pointer pointing to an appropriate memory area or disc area.

The resource area determination process involves referencing the resource management information table such as one shown in FIG. 11. The process is carried out to search for and decide on usable resource areas in the order of the resource use condition determined in the user identification process and resource use condition determination process.

The flow of the resource area determination process is described below by referring to the flowchart of FIG. 12. This process is carried out following acquisition of the result of the resource use condition determination process in the preceding second phase. In step S41, resource area numbers are first acquired which were selected from the resource use condition table as the resource use condition during the resource use condition determination process. In step S42, the resource management information table is searched for available resource areas in the order of the resource area numbers acquired as the resource use condition.

Illustratively, suppose that the resource use condition resulting from the resource use condition determination process represents resource area number 1 selected from the resource use condition table. In that case, the entry of resource number 1 in the table of FIG. 11 is referenced to check for source area availability. In the example of FIG. 11, the availability field is set for "available," which means the resource area in question is usable.

If the usable resource area is found ("Yes" in step S43), then the resource area number is returned as a result (in step S45). If no usable resource area is found ("No" in step S43), then a value such as zero is returned so as to indicate the unavailability of resource areas (in step S46).

(Connection Management)

The above-described three phases are executed to allocate necessary resources for the user in question, whereby the user's connection is established. The communication processing apparatus of this invention effects connection management over each resource area using a resource area correspondence table 101 (shown in FIG. 5). In FIG. 5, the resource area correspondence table 101 is shown included in the TCP connection processing resources 150, i.e., a table retained in an internal memory as part of the resources. Alternatively, the resource area correspondence table 101 may be held in the externally furnished storage unit 140.

FIG. 13 shows a typical data structure of the resource area correspondence table 101. As shown in FIG. 13, this table includes end points matched with resource area numbers. The end points are each composed of a sender IP address, a sender port number, or the combination of both. Each resource area number is the number of the resource area being used for the connection with the corresponding end point.

Suppose now that the number of connections being established by the apparatus and the number of the resource area being used thereby are acquired from the resource area correspondence table and that the number of connections set for the resource area in question is found equal to the maximum connection count set in the resource management information table (see FIG. 11). In that case, the corresponding area availability field in the resource management information table is changed from "available" to "unavailable."

As described above, the first example of the resource determination process includes:

first phase constituted by the user identification process in which either the user alone, or both the user and the service to be used, are identified according to the traffic data in the TCP connection request;

second phase made of the resource use condition determination process in which each identified user is assigned the corresponding resource use condition; and third phase composed of the resource area determination process in which the usable resource area is determined in keeping with the resource use condition.

The resource determination process constituted by the three phases above imposes restrictions on the use of resource areas depending on the user. As a result, low-priority users are illustratively allowed to use only limited resource areas while high-priority users are authorized to employ all resources.

In the foregoing description, the user as the connection-requesting party was shown identified in accordance with the sender IP address and sender MAC address preparatory to resource allocation. Alternatively, the destination port number may be obtained from header data in the SYN packet so as to allocate resources based on the obtained destination port number. This alternative, if implemented, makes it possible to establish a predetermined resource utilization rate depending on the destination port number, i.e., on the protocol complying with the destination.

[Resource Determination Process: Second Example]

Described below is the second example of the resource determination process involving restricting the number of connections for each user so as to determine connection availability for the user in question depending on his priority.

Figure 14:
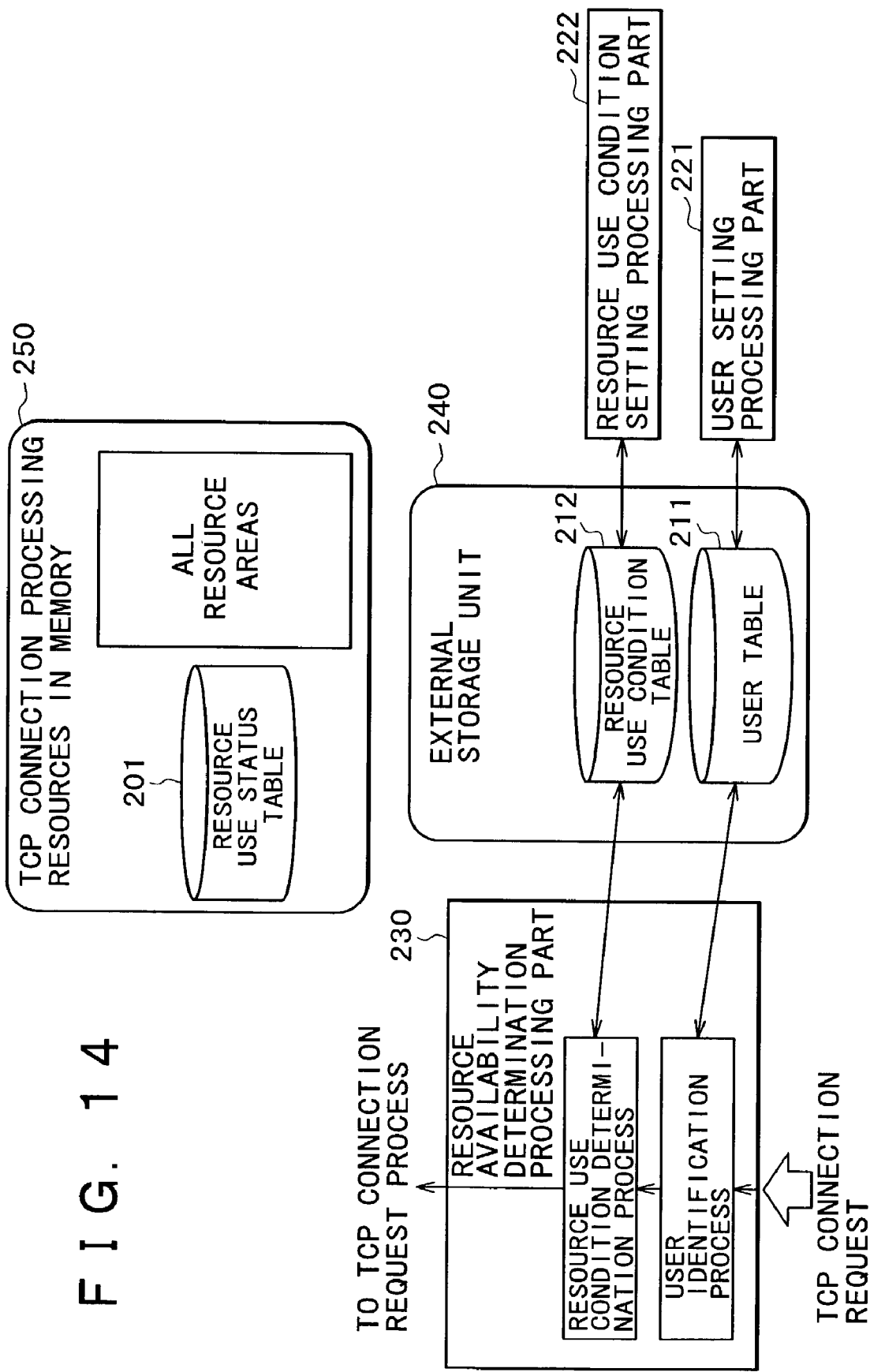
FIG. 14 is a schematic flow diagram outlining another TCP connection request process (second example in the ensuing description) carried out by the inventive communication processing apparatus.

FIG. 14 is a schematic flow diagram showing details of the resource determination process which is performed, in response to a TCP connection request to the inventive communication processing apparatus, by that controlling element of the apparatus which provides communication processing control.

TCP connection processing resources 250 in FIG. 14 represent a collection of resources (memory areas and disc areas) for use in TCP traffic processing. Unlike in the above-described first example of the resource determination process, the resources are not divided into multiple areas.

A resource availability determination processing part 230 in FIG. 14 carries out two processing phases, "a" and "b." The processing phase "a" is the same as the first phase of the first example, i.e., a process in which either the user alone or both the user and the service to be used are identified on the basis of the traffic data in the TCP connection request.

The processing phase "b" is a process unique to the second example of the resource determination process. This phase involves initially comparing the current number of connections with the number of available connections for the user ID of interest. If the current connection count does not exceed the available connection count set for the user ID in question, the connection is allowed to be established. If the current connection count is found in excess of the available connection count for the user ID, then a check is made to see if there are any available connections among those set aside for other user IDs. If a connection is found available, then the connection is appropriated and established for the user ID.

As depicted in FIG. 14, the two phases, i.e., user identification process and resource use condition termination process, are carried out by referring respectively to a user table 211 and a resource use condition table 212 retained in a storage unit 240. Information is written to or updated in the tables 211 and 212 by a user setting processing part 221 and a resource use condition setting processing part 222 respectively. A resource use status table 201 is provided to manage resource use status.

Typical structures of these tables are depicted in some of the accompanying drawings. Each of the two phases making up the resource availability determination process performed by the resource availability determination processing part 230 is described below in detail by referring to the relevant drawings.

(Phase "a": User Identification Process)

The user identification process is a process that identifies the user, i.e., an individual or a terminal requesting the communication processing apparatus to establish connection, the process being executed by the apparatus upon receipt of a SYN packet from the communication-requesting party. This process is the same as that in the above-described first phase of the resource determination process and thus will not be described here in detail.

In short, the user identification process involves identifying either the user alone or both the user and the service to be used based on the traffic data in the TCP connection request. The process is executed so as to acquire the user ID from the user table (see FIG. 7) through the reference thereto.

(Phase "b": Resource Use Condition Determination Process)

The resource use condition determination process is a process that determines the resource use condition with regard to the user identified in the above-mentioned user identification process. The resource use condition determination process is carried out by referring to the resource use condition determination table 212.

Figure 16:
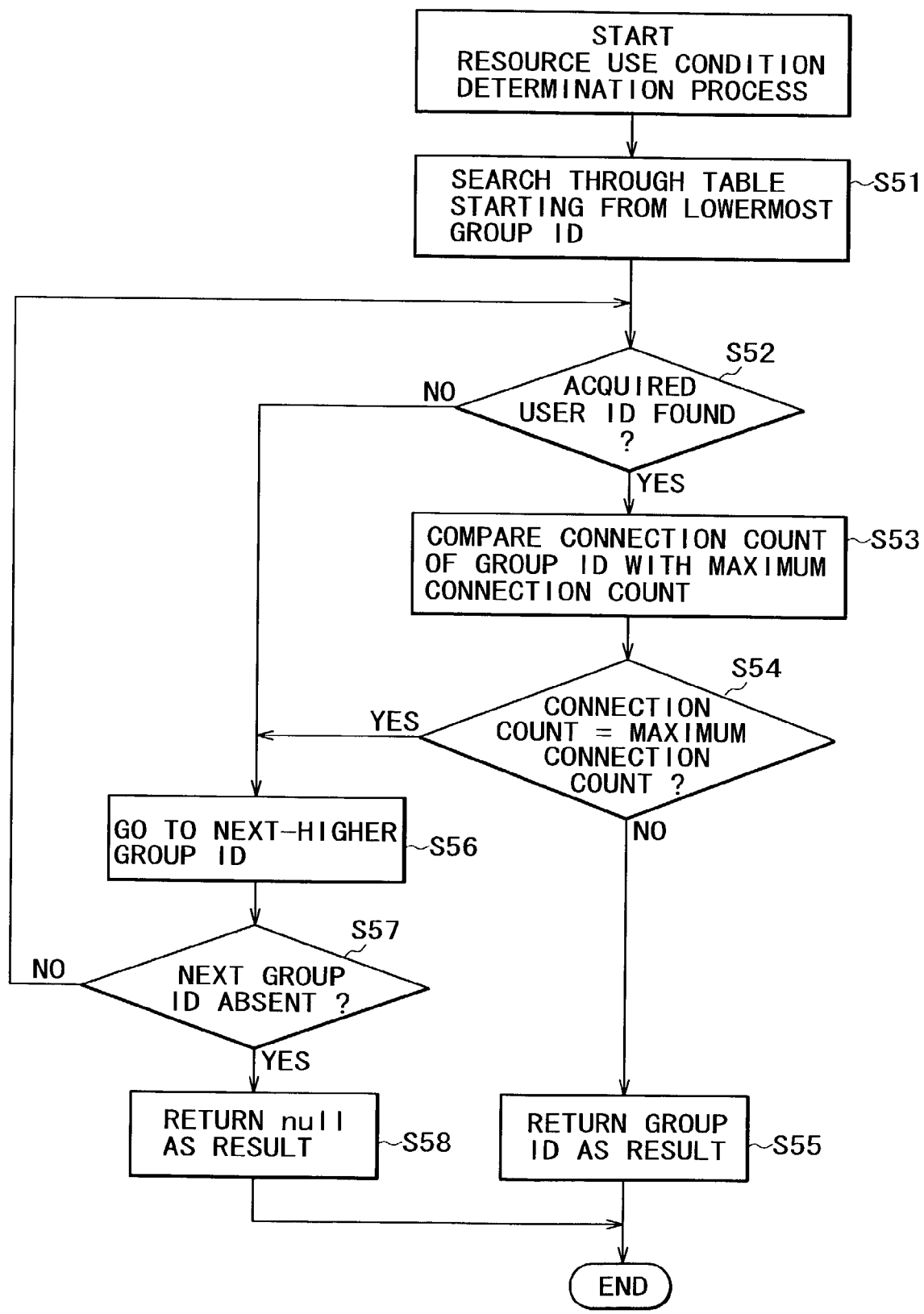
FIG. 16 is a flowchart of steps constituting another resource use condition determination process (second example in the ensuing description) performed by the inventive communication processing apparatus.

FIG. 15 shows a typical structure of the resource use condition determination table 212, and FIG. 16 is a flowchart of steps constituting the resource use condition determination process executed with reference to the resource use condition determination table 212. As illustrated in FIG. 15, the table 212 has group IDs and user IDs each associated with a maximum available connection count as the resource use condition and a current connection count.

The group ID is an identifier that identifies the resource use condition. A group ID represents a list of user IDs belonging to that group ID. The same user ID may be included in a plurality of group IDs. The maximum connection count is the largest number of connections allowed to be established with the users within a given group ID. The current connection count is the current number of connections utilized by users belonging to a given group ID.

Whether or not a connection can be established in response to a received connection request is determined by searching through the resource use condition determination table based on the user ID acquired in the phase "a." Specifically, a check is made to see if the acquired user ID is found in any of the group IDs starting from the lowermost group ID in the table. When a group ID is found which includes the user ID of interest, the current connection count is compared with the maximum connection count for that group ID. If the current connection is judged smaller than the maximum connection count, then the connection is allowed to be established. In this case, the connection is established as part of the group ID in question.

Described below with reference to FIG. 16 is how the resource use condition determination process is carried out. This process is initiated following acquisition of the result from the above-described user identification process in the phase "a." Upon receipt of a user ID from the upstream user identification process, the resource use condition table (FIG. 15) is searched for a corresponding entry in the group IDs starting from the lowermost group ID. A check is made to see if the received user ID is included in any of the entries of the group IDs (in step S51).

If there exists an entry containing the user ID received from the user identification process ("Yes" in step S52), then a comparison is made between the current connection count for the entry in question in the resource user condition determination table on the one hand, and the corresponding maximum connection count on the other hand (in step S53).

If the current connection count is judged to be smaller than the maximum connection count ("No" in step S54), then a usable resource is judged to exist. In that case, the group ID corresponding to the table entry in question is returned (in step S55).

If there is no entry corresponding to the user ID derived from the user identification process ("No" in step S52) or if there exists the corresponding entry but the current connection count is judged equal to the maximum connection count ("Yes" in step S54), then the entries of the next-higher group ID are checked (in step S56). The above steps are repeated in a loop. Data "null" are returned (in step S58) in one of two cases: if checks on the data entries of all group IDs in the resource use condition determination table fail to reveal any entry containing the user ID in question; or if an entry including the user ID is found but the current connection count is judged equal to the maximum connection count for that entry.

If the result of the resource use condition determination process is "null," that means there is no usable resource. In that case, the SYN packet of the TCP connection request is rejected. If any group ID is acquired as a result of the resource use condition determination process, then the usual TCP connection request process is carried out.

(Connection Management)

The above-described two phases, when executed, establish connection with each requesting user by allocating suitable resources to the user in question according to the priority assigned to that user. The communication processing apparatus of this invention uses the resource use status table 201 (shown in FIG. 14) when effecting connection management over each resource area.

FIG. 17 shows a typical data structure of the resource use status table 201. As illustrated in FIG. 17, this table includes end points matched with group IDs. The end points are each composed of a sender IP address, a sender port number, or the combination of both, and associated with a corresponding group ID used for the connection.

When resources are to be allocated in a TCP connection process, the end point for the new connection and the group ID derived from the resource use condition determination process are written to the resource use status table. In the resource use condition table, the current connection count for the group ID in question is incremented by one.

At the end of a connection, the resources allocated for that connection are released as follows: the group ID corresponding to the end point for the connection in question is first acquired by looking up the resource use status table such as one in FIG. 17. In the resource use condition table, the current connection count corresponding to the acquired group ID is decremented by one. Then the entry associated with this connection is deleted from the resource use status table.

As described above, the second example of the resource determination process includes:
  phase "a" constituted by the user identification process in which either the user alone, or both the user and the service to be used, are identified according to the traffic data in the TCP connection request; and
  phase "b" in which the maximum allowable connection count set for each user ID is compared with the current connection count for the user ID in question. If the current connection count is not judged to be in excess of the maximum connection count for the user ID, then the connection is established. If the current connection count is judged to exceed the maximum connection count, a check is made to see if there are any available connections among those set aside for other user IDs. If a connection is found available, then the connection is appropriated and established for the user ID.

The resource determination process constituted by the two phases above imposes restrictions on the number of established connections depending on the user. As a result, low-priority users are illustratively allowed to use only a limited number of connections while high-priority users are authorized to utilize numerous connections. Where the connection count is limited regarding each user belonging to a plurality of group IDs, flexible connection count management can be implemented.

In the foregoing description, the user as the connection-requesting party was shown identified in accordance with the sender IP address and sender MAC address preparatory to connection establishment. Alternatively, the destination port number may be obtained from header data in the SYN packet so as to allocate resources based on the obtained destination port number. This alternative, if implemented, makes it possible to establish a predetermined number of connections depending on the destination port number, i.e., on the protocol complying with the destination.

[Typical Structure of the Communication Processing Apparatus]

Figure 18:
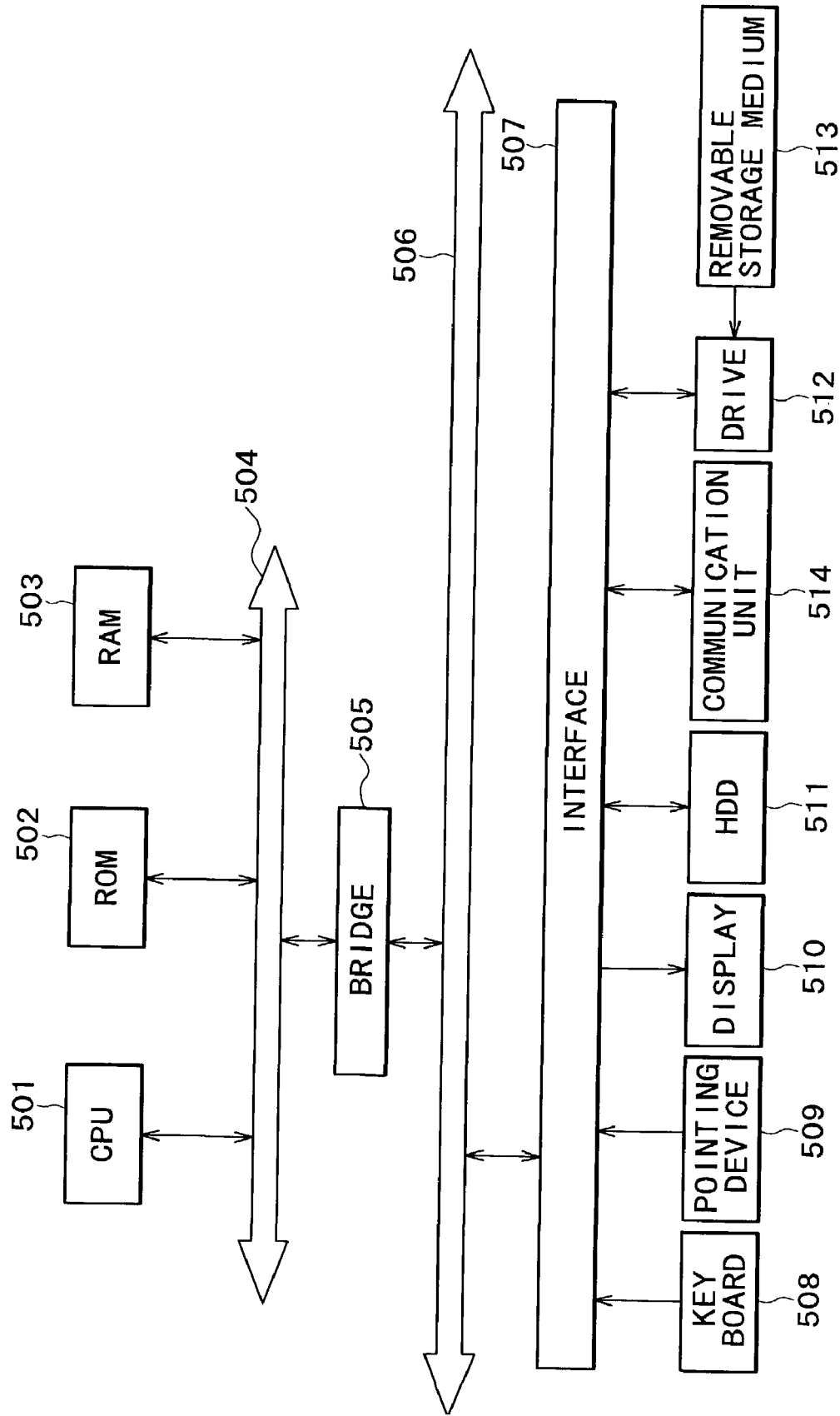
FIG. 18 is a schematic view indicating a typical structure of the inventive communication processing apparatus.

A typical structure of the communication processing apparatus will now be described by referring to FIG. 18 which outlines the apparatus structurally. In FIG. 18, a CPU (central processing unit) 501 is an arithmetic logic unit that executes an OS (operating system) and various application programs. A ROM (read-only memory) 502 retains fixed data as part of the programs and operation parameters used by the CPU 501. A RAM (random access memory) 503 serves as a work area that accommodates programs executed by the CPU 501 and parameters varied as needed during the program execution.

A host bus 504 is connected via a bridge 505 to an external bus 506 such as a PCI (Peripheral Component Interconnect/Interface) bus.

A keyboard 508 is operated by a user to enter various commands into the CPU 501. A pointing device 509 is manipulated by the user to point to and select items on the screen of a display 510. The display 510 is constituted illustratively by a CRT (cathode ray tube) or a liquid crystal display (LCD) displaying diverse kinds of information in text and image. A hard disk drive (HDD) 511 drives a hard disc as a storage medium, writing and reading programs and data to and from the hard disc.

A drive 512 writes and reads programs or data to and from a removable storage medium 513 such as a floppy disc, CD-ROM (compact disc read only memory), MO (magneto-optical) disc, DVD (digital versatile disc), magnetic disc, or semiconductor memory, for reproduction and storage purposes.

When programs or data are retrieved from the storage medium for transfer to the CPU 501 for execution or processing, the retrieved programs or data are first sent illustratively to the RAM 503 via an interface 507, the external bus 506, bridge 505, and host bus 504.

The components ranging from the keyboard 508 to the drive 512 are connected to the interface 507. In turn, the interface 507 is connected to the CPU 501 via the external bus 506, bridge 505, and host bus 504.

A communication unit 514 communicates with a terminal or a server connected to the communication processing apparatus illustratively through a router. In this connection setup, the communication unit 514 receives data from the CPU 501, HDD 511 or the like, transmits the received data in packets to the outside, and receives externally supplied packets of data via the router. The communication unit 514 is connected to the CPU 501 through the external bus 506, bridge 505, and host bus 504.

The series of steps described above may be executed by hardware, by software, or by the combination of both. For software-based processing to take place, programs constituting processing sequences may be either loaded from dedicated hardware of a computer into its internal memory for execution, or installed upon program execution from a suitable program storage medium into a general-purpose personal computer capable of executing diverse functions.

Illustratively, the programs may be written in advance onto the hard disk or ROM (read only memory) serving as the storage medium. Alternatively, the programs may be stored temporarily or permanently on any of such removable storage media as the floppy disc, CD-ROM (compact disc read only memory), MO (magneto-optical) disc, DVD (digital versatile disc), magnetic disc, and semiconductor memory. These removable storage media may be offered as what is known as package software.

Besides being installed from the above-mentioned removable storage medium into the computer for execution, the programs may alternatively be downloaded from a download site to the computer either wirelessly or in wired fashion over such networks as a LAN (local area network) or the Internet. The computer may install the downloaded programs onto the hard disc or some other suitable internal storage medium.

In this specification, the steps which are stored on a program storage medium and which describe the programs to be executed represent not only the processes that are carried out in the depicted sequence (i.e., on a time series basis) but also processes that are conducted parallelly or individually depending on the user's need or on the throughput of the apparatus in charge of program execution. As mentioned earlier, the term "system" in this specification refers to a logically assembled configuration of multiple devices which may or may not be housed in a single enclosure.

To sum up, the communication processing apparatus and communication processing method according to the invention are designed to identify a connection-requesting user and to determine resource areas for use by the identified user in accordance with the resource use condition established for that user. Its ability to allocate more resources for users of higher priorities allows the communication processing apparatus dealing with numerous connection requests from users in the general public to establish connections preferentially with specific users.

The inventive communication processing apparatus and communication processing method are also designed to establish a predetermined number of available connections depending on the identified user and to grant or deny a new connection in keeping with the connection count set for the user in question. Its capability to provide more connections to users of higher priority enables the communication processing apparatus handling numerous connection requests from users in the general public to establish connections preferentially with particular users.

Furthermore, the inventive communication processing apparatus and communication processing method may preferably acquire a destination port number besides the sender IP address and sender MAC address as user information, so as to allocate resources in accordance with the acquired destination port number. This makes it possible to establish a preferential resource utilization rate depending on the destination port number, i.e., on the protocol complying with the destination.

In addition, the inventive communication processing apparatus and communication processing method may preferably include effective measures to counter low-priority users trying to establish numerous connections or launching DoS attacks on TCP traffic processing resources in an attempt to disable establishment of legitimately requested connections.

It is to be understood that while the invention has been described in detail in conjunction with specific embodiments, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. A communication processing apparatus for selectively establishing a connection, said communication processing apparatus comprising a electronic processor for performing a connection availability determination process based upon a new connection request, the electronic processor selectively providing transmission of data contained on a server positioned at an endpoint of a network connection based upon a priority of a user requesting data from the, server and located at another endpoint of the network connection;

wherein said electronic processor performs a user identification process for identifying the requesting user based on data contained within said connection request, said controlling means further performing said process for establishing said connection only if sufficient communication processing resources required for said user having a user identifier acquired in said user identification process are judged to be available for allocation to said user, the determination of available resources being made, at least in part, based on priority classification information associated with the identified user and resource use condition information for one or more resources corresponding to the priority classification information, and wherein more resources are available for a user having high priority than a user having low priority; and further wherein the communication processing apparatus has access to a data structure, that identifies a plurality of classes of users and members of each user class along with an indication as to whether resources for each user class are available, the data structure being, used in making a determination as to whether establish a user connection based on the new connection request, wherein said electronic processor performs said process for establishing said connection by successively carrying out:

a user identification process for identifying the user corresponding to said connection request sender based on a user table which associates user address information with user identifiers; and a resource use condition determination process that associates said identified user with a group identifier that identifies a particular group of users and then searches a resource use condition table for an entry of any available resources based on the available resources to the associated group identifier, wherein said resource use condition determination process also associates said group-identifier, that said identified user associates with, with a maximum connection count and a current connection count, and wherein resources are determined to be available for the identified user only if the current connection count for the associated group identifier is less than the maximum connection count.

2. A communication processing apparatus for selectively establishing a connection, said communication processing apparatus comprising a electronic processor, for performing a connection availability determination process based upon a new connection request, the electronic processor selectively providing transmission of data contained on a server positioned at an endpoint of a network connection based upon a priority of a user requesting data from the server and located at another endpoint of the network connection;

wherein said electronic processor performs a user identification process for identifying the user based on data contained within said connection request, said controlling means further performing said process for establishing said connection only if sufficient communication processing resources required for said user having a user identifier acquired in said user identification process are judged to be available for allocation to said user, the determination of available resources being made, at least in part, based on priority classification information associated with the identified user and resource use condition information for one or more resources corresponding to the priority classification information, and wherein more resources are available for a user having high priority than a user having, low priority; and further wherein the communication processing apparatus has access to a data structure that identifies a plurality of classes of users and members of each user class along with an indication as to whether resources for each user class are available, the data structure being, used in making a determination as to whether establish a user connection based on the new connection request, wherein said electronic processor performs said process for establishing said connection by successively carrying out:

a user identification process for identifying the user corresponding to said connection request sender based on a user table which associates user address information with user identifiers; and a resource use condition determination process that associates said identified user with a group-identifier that identifies a particular group of users and then searches a resource use condition table for an entry of any available resources based on the available resources to the associated group identifier; and wherein said group identifiers are arranged in a hierarchy, such that users associated with a particular group identifier at a particular priority also have access to all of the resources associated with group identifiers having a lower priority than the particular priority, wherein said resource use condition determination process also associates said group-identifier, that said identified user associates with, with a maximum connection count and a current connection count, and wherein resources are determined to be available for the identified user only if the current connection count for the associated group identifier is less than the maximum connection count.

3. A communication processing method for a server positioned at an end point of a network connection for selectively establishing a connection upon receipt of a communication connection request from a requesting user based upon a priority of the user, said communication processing method comprising:

the communication processing method is executed by a electronic processor;

performing a user identification process for identifying the user representing the connection request sender based on data contained within said connection request; and performing a resource determination process for establishing said connection with said user only if sufficient communication processing resources required for said user having a user identifier acquired in said user identification process are judged to be available for allocation to said user, the determination of available resources being made, at least in part, based on priority classification information associated with the identified user and resource use condition information for one or more resources corresponding to the priority classification information, and wherein more resources are available for a user having high priority than a user having low priority;

and selectively providing transmission of data contained on the server via the connection if the resources are available;

and further comprising accessing data from a data structure that identifies a plurality of classes of users and members of each user class along with an indication as to whether resources for each user class are available, the data structure being used in making a determination as to whether establish a user connection based on the new connection request, wherein said method for performing said process for establishing said connection further comprises the steps of successively carrying out:

a user identification process for identifying the user corresponding to said connection request sender based on a user table which associates address information with user identifiers; and a resource use condition determination process that associates said identified user with a group-identifier that identifies a particular group of users and then searches a resource use condition table for an entry of an available resources based on the available resources corresponding to the associated group identifier;

wherein said resource use condition determination process also associates said group-identifier, that said identified user associates with, with a maximum connection count and a current connection count, and wherein resources are determined to be available for the identified user only if the current connection count for the associated group identifier is less than the maximum connection count.

* * * * *